(No Model.)

W. P. GREENWOOD.
Rosette.

No. 228,887.    Patented June 15, 1880.

Witnesses:
E. A. Hemmenway
E. E. Chandler

Inventor:
Wm P. Greenwood
by N. C. Lombard
Attorney.

UNITED STATES PATENT OFFICE.

WILLIAM P. GREENWOOD, OF CAMBRIDGEPORT, MASSACHUSETTS.

ROSETTE.

SPECIFICATION forming part of Letters Patent No. 228,887, dated June 15, 1880.

Application filed April 5, 1880. (No model.)

*To all whom it may concern:*

Be it known that I, WILLIAM P. GREENWOOD, of Cambridgeport, in the county of Middlesex and State of Massachusetts, have invented certain new and useful Improvements in Rosette Attachments, of which the following, taken in connection with the accompanying drawings, is a specification.

My invention relates to rosettes to be worn at funerals by members of the Independent Order of Odd Fellows, Masons, and other societies; and it consists, first, of a rosette provided upon its back with a pin for securing it to the lapel of the coat and a socket to support a bouquet of flowers or a sprig of evergreen in such a manner that said flowers or evergreen may be readily removed without unfastening or removing the rosette.

It further consists of a rosette provided with an attaching-pin, a bouquet-holding loop or socket, and a pendent hook for supporting the officer's jewel, as will be hereinafter described.

It is customary for Odd Fellows, when attending the funeral of a deceased brother, to discard their regalia and wear instead a mourning-rosette pinned upon the lapel of the coat, the officers wearing their distinguishing-jewels, and all wearing a sprig of evergreen secured by the rosette, which sprig of evergreen is removed at the grave and thrown upon the coffin. To do this the rosette has to be removed and then reattached to the coat, which is considerable trouble, and in cold weather is particularly objectionable, and heretofore the attachment of the jewel has been independent of the rosette, which is not as convenient as to attach the whole by one fastening, as provided for in my improved rosette, illustrated in the accompanying drawings, in which—

Figure 2:
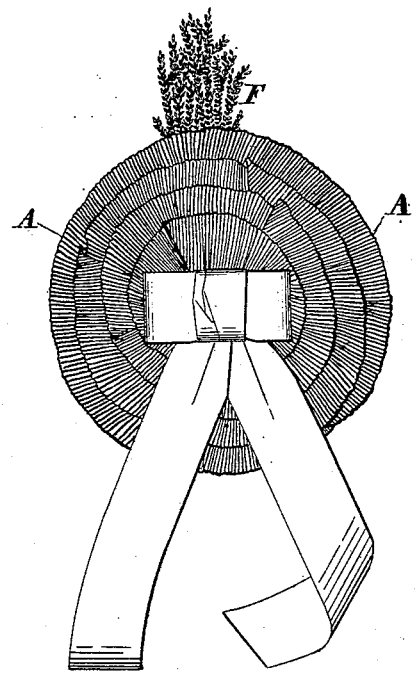
Figure 3:
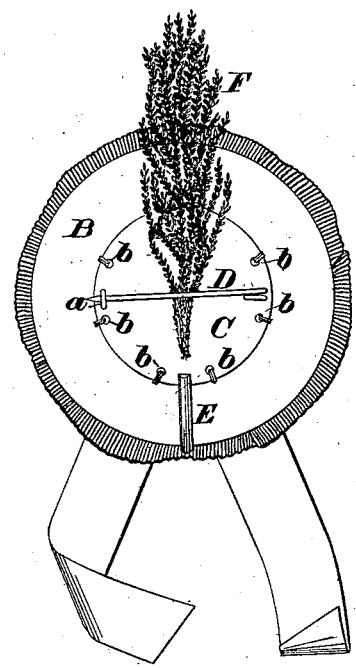
Figure 1:
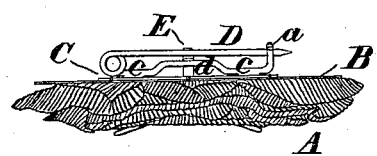
Figure 4:
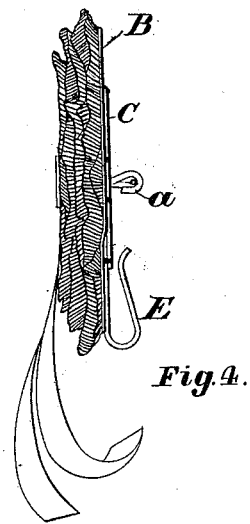

Figure 1 is a plan, Fig. 2 a front elevation, Fig. 3 a rear elevation, and Fig. 4 an edge view, of a rosette and attachments embodying my invention.

A is the body of the rosette, made of crêpe, in the usual form, and secured upon a backing, B, of some stiffer material, which, in turn, has secured to its back the metal disk C, to which is attached the spring-pin D, the point of which engages with the hook $a$ in a well-known manner, and thereby firmly secures the rosette to the coat or other article of wearing-apparel through which the pin D may have been passed. The disk C is secured to the back of the rosette by sewing, it being provided with a series of small holes, $b\ b$, for the purpose.

E is a hook secured to and depending from the lower edge of the plate or disk C, as shown in Figs. 3 and 4, and is designed to be used as a means of suspending the jewel of an officer in such a manner that the whole may be secured to the coat by the single pin D.

The pin D and hook $a$ in the case illustrated in the drawings are made from one piece of wire, and soldered at $c\ c$ to the plate C, that part of said wire which is next to and soldered to said plate having formed therein two double reverse bends, whereby the center portion of said wire is removed from the plate C to form a loop or socket, $d$, as shown in Fig. 1, through which the stem of a sprig of evergreen, F, or of one or more flowers may be passed, as shown in Fig. 3, and be thereby supported and retained in position till it becomes necessary to remove it, when it can be removed without disturbing the rosette.

What I claim as new, and desire to secure by Letters Patent of the United States, is—

1. A rosette provided with a pin for attaching it to a garment and a socket for supporting a bouquet or sprig of evergreen, substantially as described.

2. A rosette provided with an attaching-pin, a bouquet-holding socket, and a jewel-suspending hook, substantially as described.

Executed at Cambridge, Massachusetts, this 3d day of April, A. D. 1880.

WM. P. GREENWOOD.

Witnesses:
HERMAN BIRD,
JOS. M. OXFORD.